United States Patent Office 3,435,226
Patented Mar. 25, 1969

3,435,226
OPTICAL PULSE GENERATOR
Alois J. Rack, Martinsville, N.J., assignor to Bell Telephone Laboratories, Incorporated, New York, N.Y., a corporation of New York
Filed Oct. 20, 1965, Ser. No. 498,505
Int. Cl. H04b 9/00
U.S. Cl. 250—199　　　　　　　　　　　　　　6 Claims

ABSTRACT OF THE DISCLOSURE

An optical pulse generator responds to each of a set of widely-spaced pulses to generate a series of equal-amplitude spaced-apart pulses suitable for efficient use in an information processing system. The generator comprises an array of identical reflecting-transmitting mirrors combined with fully-reflecting mirrors. Positioned before each fully-reflecting mirror is a modulator whose state is controlled by signals applied thereto from an information source. An incident input pulse is directed by the reflecting-transmitting mirrors along multiple paths to the modulators. Pulses that are propagated through the modulators are reflected back through the assemblage and selectively recombined to form a train of equal-amplitude pulses that respectively occur in spaced time periods in the interpulse interval that is characteristic of the widely-spaced incident input pulses.

---

Figure 1:
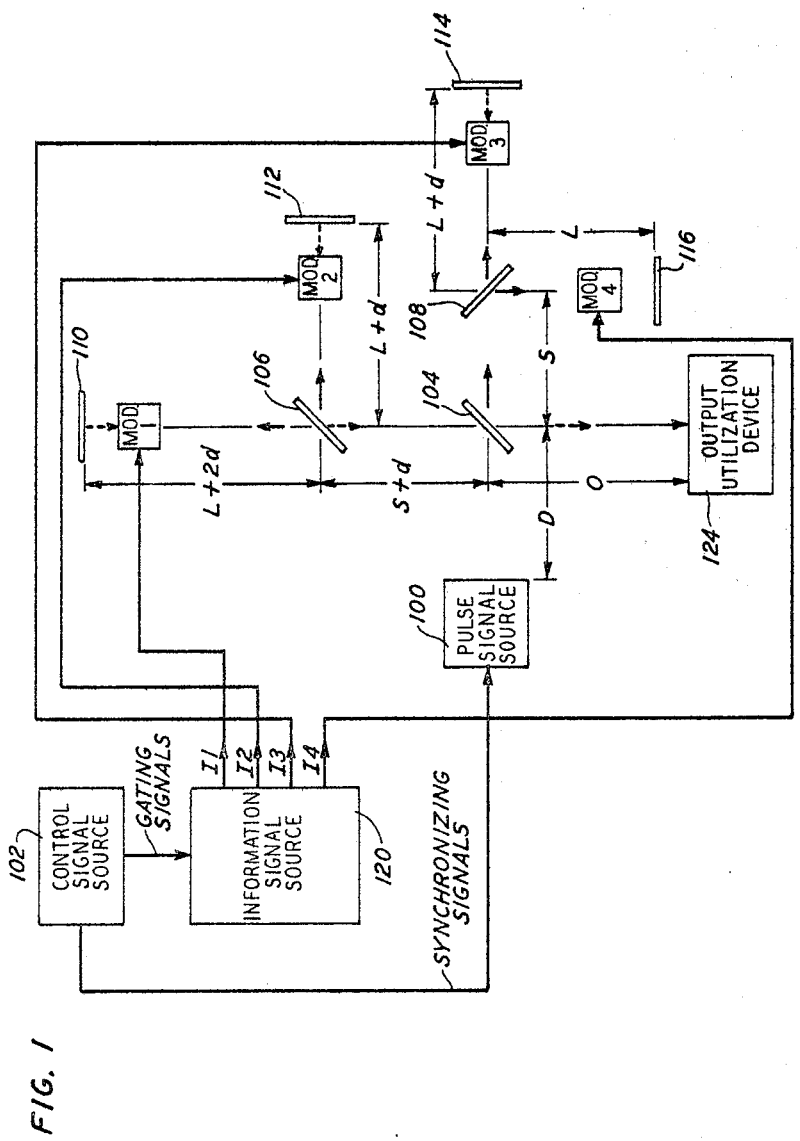

This invention relates to signal translating and more particularly to an arrangement for generating pulses suitable for use in an optical information processing system.

It is known to operate a laser in a mode wherein the output thereof comprises a series of very narrow pulses that are relatively widely spaced apart. In particular, the output pulses of one specific illustrative such laser are each characterized by a width of approximately 0.5 nanosecond. The pulse period of this specific laser is about 10 nanoseconds. L. E. Hargrove application Ser. No. 362,319, filed Apr. 24, 1964, describes a pulsed laser of this general type.

The information-handling capacity per unit time of a system that is designed to process narrow nanosecond pulses can be significantly increased if the pulse train output of a Hargrove-type laser is modified. Specifically, the information handling-capacity of the pulsed output thereof can be increased by generating a plurality of additional pulses during the aforenoted relatively wide interpulse interval. In turn, the plural optical pulses generated in response to each single signal supplied by the laser are adapted to be processed by arrangements such as optical transmission lines and memories.

An object of the present invention is the improvement of optical signal processing systems.

More specifically, an object of this invention is an arrangement for generating a pulse train suitable for efficient use in an optical information signal processing system.

Another object of the present invention is a reliable optical pulse generator that is characterized by simplicity of design and ease of fabrication.

These and other objects of the present invention are realized in a specific illustrative embodiment thereof that comprises a plurality of identical beam-splitting mirrors. A first or input one of these mirrors responds to an applied input optical pulse by transmitting half of the incident energy along a first path and by reflecting the remaining half of the incident energy along a second path. Subsequently, two mirrors respectively positioned in the first and second paths direct the propagated pulses along third and fourth, and fifth and sixth, optical paths. Additional suitably-positioned identical beam-splitting mirrors are effective to further subdivide the pluses. In this way, the input pulse is eventually split into a prescribed number of equal-amplitude signals that are respectively directed to a multiplicity of modulation channels.

Each modulation channel includes an optical modulator and a fully-reflecting mirror. Any signal that passes through a modulator is reflected back therethrough by its associated fully-reflecting mirror. This reflected signal is then directed by selected ones of the beam-splitting mirrors to the aforenoted input mirror, which causes one-half of the pulse energy incident thereon to be propagated along an output path to a utilization device.

The total lengths of the various paths traversed by pulses in propagating to the utilization device are respectively different. In particular, these lengths are so proportioned that each pulse which is reflected back through the assemblage reaches the utilization device in a different one of a plurality of spaced time slots. As a result, the embodiment responds to a single applied input pulse to produce an output sequence of spaced equal-amplitude pulses (or no-pulses). Whether or not an output pulse appears in its assigned time slot is, of course, a function of the condition of its associated modulator.

It is a feature of the present invention that an optical pulse arrangement include a plurality of identical beam-splitting mirrors responsive to a single input pulse for generating a plurality of equal-amplitude pulses.

It is another feature of this invention that the equal-amplitude pulses generated by the arrangement be directed to a respective plurality of molulation channels.

It is a further feature of the present invention that each such channel include an optical modulator unit and an associated fully-reflecting mirror, whereby pulses reflected back from the fully-reflecting mirrors are directed by the beam-splitting mirrors to an output path.

It is a still further feature of this invention that the lengths of the respective paths traversed by the equal-amplitude pulses in reaching the output path are different, so that any pulses directed to the output path arrive thereat in spaced-apart sequence.

Figure 2:
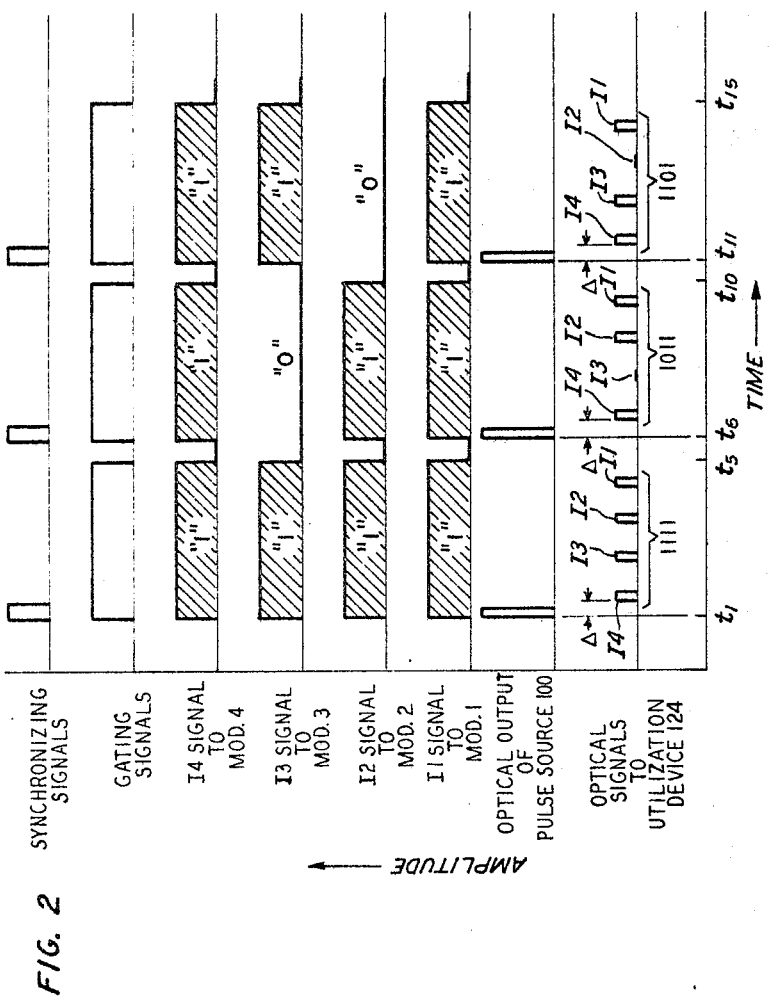

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 shows a specific illustrative optical pulse generating arrangement made in accordance with the principles of the present invention; and FIG. 2 depicts various waveforms representative of the mode of operation of the arrangement shown in FIG. 1.

The arrangement of FIG. 1 includes a pulse signal source 100 which may, for example, comprise a pulsed laser of the type described in the aforecited Hargrove application. Synchronizing signals are applied to the source 100 from a control signal source 102. In response to each such synchronizing signal (represented in the top row of FIG. 2) the source 100 emits a narrow pulse of electromagnetic energy of the general form shown in the next-to-the-bottom row of FIG. 2.

The pulse emitted by the source 100 of FIG. 1 is directed at a first or input inclined mirror 104 of the well-known beam-splitting type. In particular, the mirror 104 is adapted to reflect one-half of the energy radiated thereat to a second beam-splitting mirror 106 and to transmit the remaining one-half of the energy incident thereon to a third beam-splitting mirror 108. Thus, if the pulse supplied by the source 100 is considered to be of unit amplitude, the input mirror 104 is effective to direct pulses each of one-half unit amplitude to the mirrors 106 and 108.

In turn, the mirror 106 shown in FIG. 1 further divides the pulse that is applied thereto. In accordance with the principles of this invention, the beam-splitting mirrors included in the illustrative embodiment are identical. Hence, the mirror 106 transmits a pulse of one-fourth unit amplitude along a path that includes a first modulator unit designated MOD1 and an associated fully-reflecting mirror 110. In addition, the mirror 106 causes a reflected pulse of one-fourth unit amplitude to be directed to a second modulator unit MOD2 and a fully-reflecting mirror 112.

In an exactly similar manner, the beam-splitting mirror 108 is effective to transmit a pulse of one-fourth unit amplitude along a path that includes a modulator unit MOD3 and a fully-reflecting mirror 114. Also, a pulse of one-fourth unit amplitude is reflected by the mirror 108 to a modulator unit MOD4 and associated fully-reflecting mirror 116.

The four modulator units shown in FIG. 1 may each comprise any known optical shutter mechanism such as, for example, a conventional Kerr cell. By applying electrical control signals to the modulator units, the conditions thereof may be selectively controlled to be either transparent or opaque to incident radiation. Illustratively, the modulator units are controlled by signals supplied by an information signal source 120. The output of the source 120 comprises four information signals designated I1, I2, I3 and I4 which are respectively applied in parallel to the four modulator units in response to the application to the source 120 of a gating signal from the control source 102. The relative occurrence of gating and information signals is indicated in rows 2 through 6 of FIG. 2.

Advantageously, the delay experienced by an electrical information signal in propagating from the source 120 along its respective lead to the associated modulator unit is so adjusted (for example by controlling lead length or by interposing a delay unit in the lead) that the peak of the information signal is applied to the modulator unit in time coincidence with the passage through the unit of its respective optical pulse.

An optical pulse that is passed by a particular modulator unit of FIG. 1 to the fully-reflecting mirror associated therewith is reflected back through that modulator unit. Specifically, assume that the modulator unit MOD1 is controlled by the source 120 during a prescribed interval of time to be transparent to incident radiation. As a result, the aforementioned pulse of one-fourth unit amplitude directed through the unit MOD1 would be reflected back therethrough by the mirror 110 to impinge upon the beam-splitting mirror 106. One-half of this impinging pulse, that is, a pulse of one-eighth unit amplitude, would be transmitted by the mirror 106 to the input mirror 104. The remaining portion of the incident pulse would be reflected by the mirror 106 to the left. This reflected portion constitutes lost energy.

In turn, the aforenoted transmitted pulse of one-eighth unit amplitude is split by the input mirror 104 into two components. One component is directed to the left and is lost. The other component, a pulse of one-sixteenth unit amplitude, is transmitted downward to an output utilization device 124, which illustratively comprises an optical transmission line or memory arrangement.

The action of the other modulator units MOD2, MOD3 and MOD4 in controlling whether or not pulses are reflected back through the described array to the output utilization device 124 is exactly analogous to the operation set forth above for the unit MOD1.

Each pulse that is reflected back from one of the fully-reflecting mirrors 110, 112, 114 and 116 in response to a single input pulse supplied by the source 100 traverses a different optical path length. More specifically, the various path lengths are so proportioned that pulses that are reflected back through the described structure arrive at the utilization device 124 in a spaced-apart sequence. For example, the length of the path traversed by a pulse in propagating from the source 100 through the unit MOD1 and to the device 124 is seen from FIG. 1 to be:

$$D+2S-2L+0+6d \quad (1)$$

Similarly, inspection of FIG. 1 reveals that the total path lengths for pulses that are directed through the modulator units MOD2, MOD3 and MOD4 are as follows, respectively:

$$D+2S+2L+0+4d \quad (2)$$
$$D+2S+2L+0+2d \quad (3)$$
$$D+2S+2L+0 \quad (4)$$

In one specific illustrative embodiment of the principles of the present invention, $d$ was selected to be 37.5 centimeters. In that particular case, the leading edges of the pulses supplied to the utilization device 124 were evenly spaced apart by 2.5 nanoseconds. In accordance with the invention, the various path lengths can be proportioned such that the output pulses are not evenly spaced. Any desired pulse spacing can be achieved simply by proper dimensioning of the inter-mirror distances. Alternatively, the relative dimensioning may be controlled by interposing electro-optic elements (not shown) in the various propagation paths. By electrically varying the index of reflection of such elements, the effective path length for radiant energy propagated therethrough may be selectively and easily altered.

FIG. 2 represents three different 4-digit information words supplied by the source 120. The first depicted word 1111 causes the modulator units MOD1, MOD2, MOD3 and MOD4 to be set in their open or unblocking states during the interval between times $t_1$ and $t_5$. Hence, during this interval pulses derived from the output of the source 100 are respectively reflected back from the fully-reflecting mirrors 110, 112, 114 and 116. After traversing their respective characteristic paths, these four reflected pulses propagate in sequence to the device 124. The first pulse supplied to the device 124 arrives thereat after a transit time delay of $\Delta$ seconds relative to the leading edge of the initiating pulse supplied at time $t_1$ by the source 100.

In the manner described above, a 4-pulse optical train uniquely representative of the input information word 1111 is generated and delivered to the output utilization device 124. The resulting pulse sequence is shown in the bottom row of FIG. 2 in the time interval designated $t_1$ through $t_5$.

During successive intervals of time, designated $t_6$ through $t_{10}$ and $t_{11}$ through $t_{15}$ in FIG. 2, signals representative of the information words 1011 and 1101 are respectively applied by the source 120 to the modulator units MOD1, MOD2, MOD3 and MOD4. In response thereto, the corresponding pulse trains shown in the bottom row of FIG. 2 are applied to the output device 124.

It is apparent from an inspection of the bottom two rows of FIG. 2 that the repetition rate of the narrow-pulse sequences delivered to the device 124 is four times the rate at which pulses are generated by the signal source 100. As a result, the information-handling capacity of the optical sequences delivered to the device 124 is enhanced over the capacity inherent in the characteristic output pulse train of the source 100. It is significant to note that this increase in capacity is achieved through the action of modulator units which, while individually operating at a maximum rate R, participate in the generation of an output pulse sequence having a repetition rate 4R.

Emphasis herein has been directed to one specific illustrative pulse generating embodiment which includes four modulator units. However, in accordance with the principles of the present invention, additional modulation channels, each including a modulator unit and an associated fully-reflecting mirror, may be established. This is accomplished, for example, simply by directing the transmitted and reflected pulses from each of the mirrors 106 and 108 of FIG. 1 at respective additional beam-splitting memories. In this way, the pulse dividing action of the FIG. 1 arrangement is increased, thereby to provide additional modulation channels and to increase the factor by which the natural pulse repetition rate of the signal source 100 is multiplied.

As the number of modulation channels is increased in the manner described above, the outwardly-extending physical dimensions of the mirror-modulator assemblage may as a practical manner attain undesirably large values. In such cases, or even in the case of the relatively simple embodiment shown in FIG. 1, fully-reflecting inclined mirrors may be positioned in selected ones of the propagation paths to direct the split pulses along folded-back routes encompassed within a more compact over-all configuration. For example, a fully-reflecting mirror may be positioned immediately to the right of the mirror 108 (FIG. 1) to reflect the pulse transmitted thereby downward to a modulation channel that includes counterparts of the unit MOD3 and the mirror 114. By means of such techniques, the lateral extent of the depicted structure may be contained within prescribed dimensional boundaries.

Thus, there has been described herein a specific exemplary arrangement which illustratively embodies the principles of the present invention. As set forth above, the arrangement responds to a single optical input pulse to generate a sequence of optical pulses suitable for efficient use in an optical information processing system.

It is to be understood that the above-described arrangements are only illustrative of the application of the principles of the present invention. In accordance with these principles, numerous other arrangements may be devised by those skilled in the art without departing from the spirit and scope of the invention. For example, although the modulator units included in the FIG. 1 arrangement are described above as being of the simple shutter mechanism type, it is of course feasible to substitute therefor units that modulate incident pulses in some other fashion. Illustratively, the modulator units may comprise electro-optic devices that selectively control the relative time of occurrence of pulses propagated therethrough.

What is claimed is:

1. Apparatus responsive to an input pulse of electromagnetic energy to generate a corresponding plurality of spaced-apart output pulses, said apparatus comprising:
    means adapted to divide said input pulse into two equal-amplitude pulses and to respectively direct said pulses along distinct first and second paths which are characterized by different propagation times,
    stationary means respectively positioned at each end of said first and second paths for fully reflecting any energy directed thereat,
    and means positioned in each of said first and second paths intermediate said dividing means and said reflecting means for modulating said equal-amplitude pulses,
    said dividing means being adapted to direct to an output utilization device in a spaced-apart relationship a portion of each equal-amplitude pulse that is propagated back to said dividing means by said reflecting means.

2. A combination as in claim 1 wherein said dividing means comprises an inclined beam-splitting mirror.
3. A combination as in claim 2 wherein said reflecting means comprises fully-reflecting mirrors respectively positioned in said first and second paths.
4. A combination as in claim 3 wherein said modulating means comprises electrically-controlled shutter devices respectively positioned in said first and second paths,
    said combination further including an information signal source connected to said devices for respectively controlling the transmission characteristics thereof.
5. A combination as in claim 4 wherein said first and second paths are characterized by propagation times that differ by at least the width of said input pulse.
6. In combination in an optical pulse generator,
    a source for supplying a train of narrow optical input pulses that are spaced relatively far apart, each such input pulse being characterized by an amplitude of one unit,
    a first beam-splitting mirror responsive to each of said input pulses for dividing each of them into two one-half unit amplitude pulses and for respectively directing said reduced-amplitude pulses along first and second paths,
    a second beam-splitting mirror positioned in said first path and responsive to each one-half unit amplitude pulse radiated thereat for dividing each such pulse into two one-fourth unit amplitude pulses and for respectively directing said last-mentioned pulses along first and second modulation channels,
    a third beam-splitting mirror positioned in said second path and responsive to each one-half unit amplitude pulse radiated thereat for dividing each such pulse into two one-fourth unit amplitude pulses and for respectively directing said last-mentioned pulses along third and fourth modulation channels,
    fully-reflecting mirrors respectively positioned in said modulation channels,
    and modulator units respectively positioned in said channels intermediate said fully-reflecting mirrors and said associated beam-splitting mirrors,
    said first mirror being adapted to direct to an output utilization device one-half of the energy of each pulse propagated back to said first mirror from said fully-reflecting mirrors,
    the respective distances between said first mirror and said fully-reflecting mirrors being proportioned such that pulses that are reflective back from said fully-reflecting mirrors to said first mirror arrive thereat in spaced time periods in the interpulse interval that is characteristic of the output train of said source.

References Cited

UNITED STATES PATENTS

| | | | |
|---|---|---|---|
| 2,745,316 | 5/1956 | Sziklai | 350—150 |
| 3,302,027 | 1/1967 | Fried | 250—199 |
| 3,256,443 | 6/1966 | Moore | 250—199 |
| 3,297,876 | 1/1967 | De Maria | 250—199 |

ROBERT L. GRIFFIN, *Primary Examiner.*

A. J. MAYER, *Assistant Examiner.*

U.S. Cl. X.R.

332—7.51